Patented Feb. 20, 1934

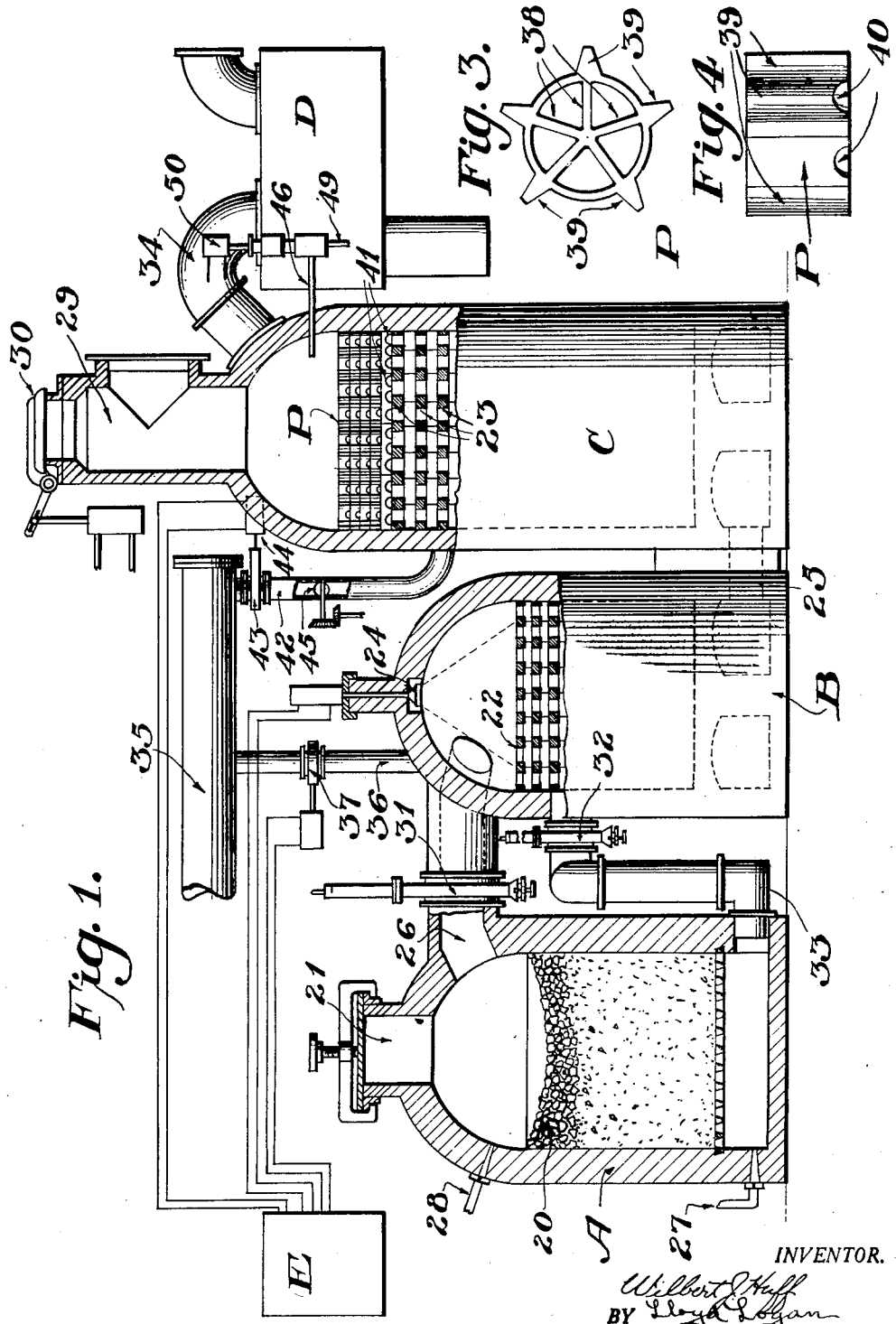

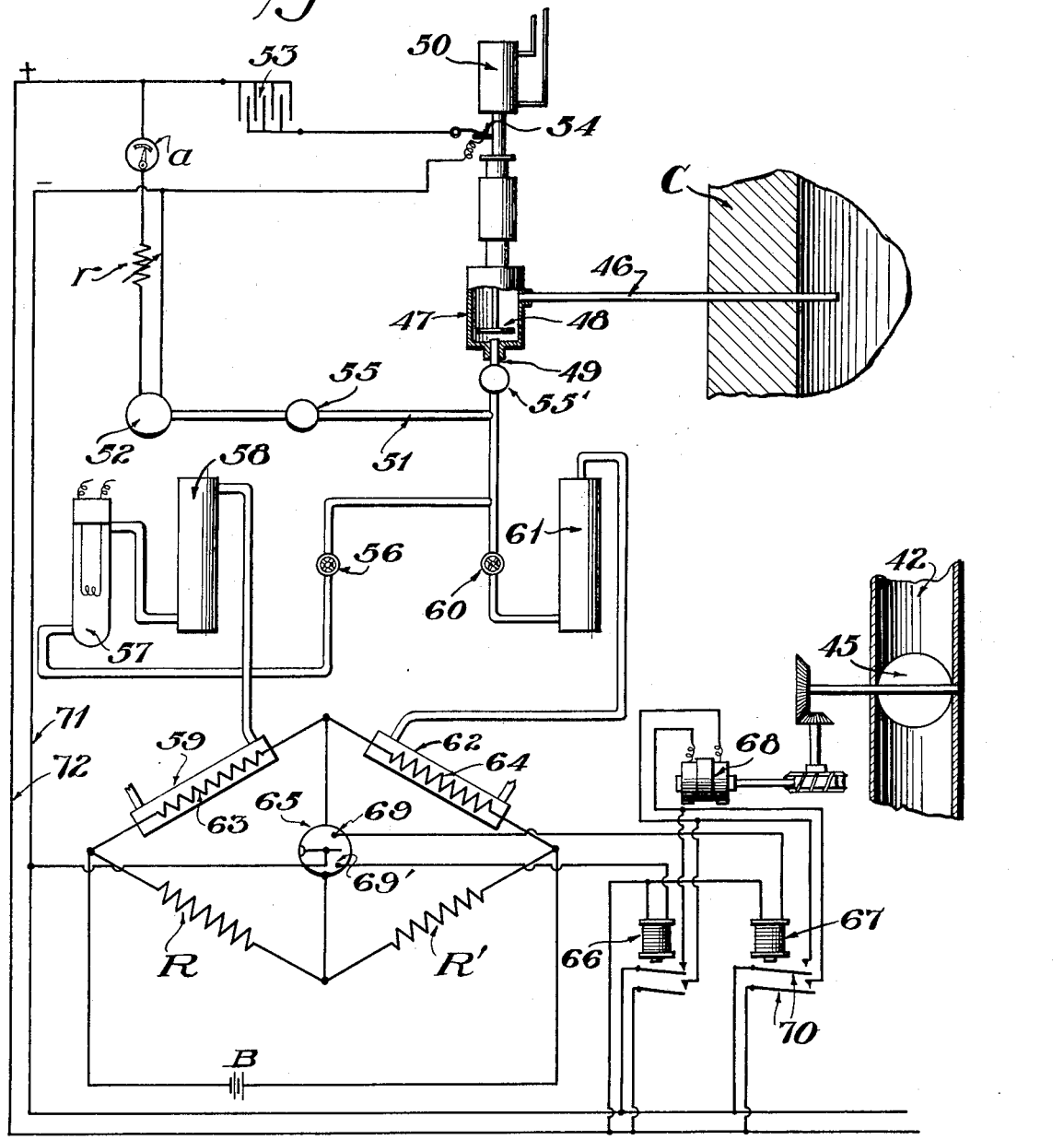

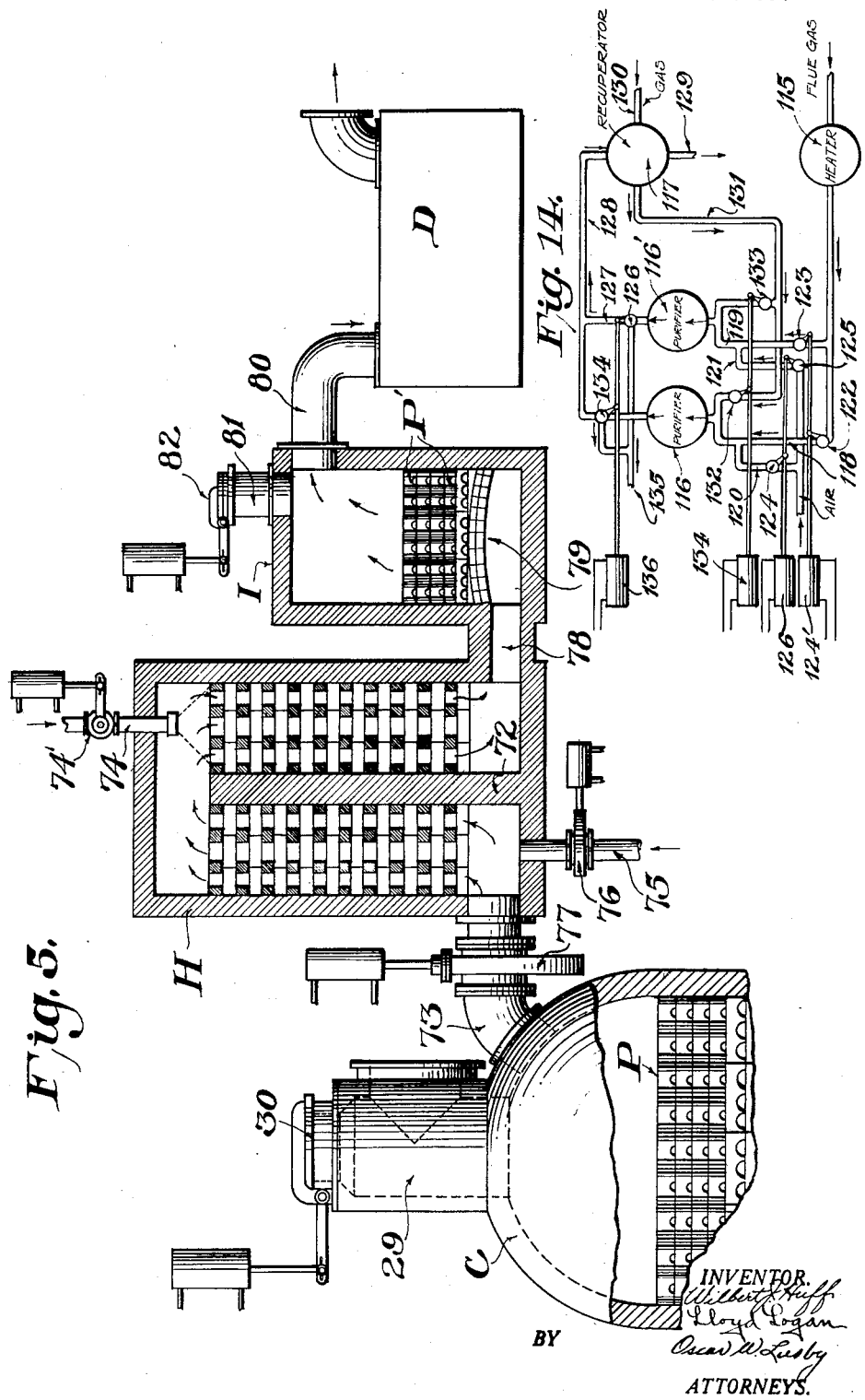

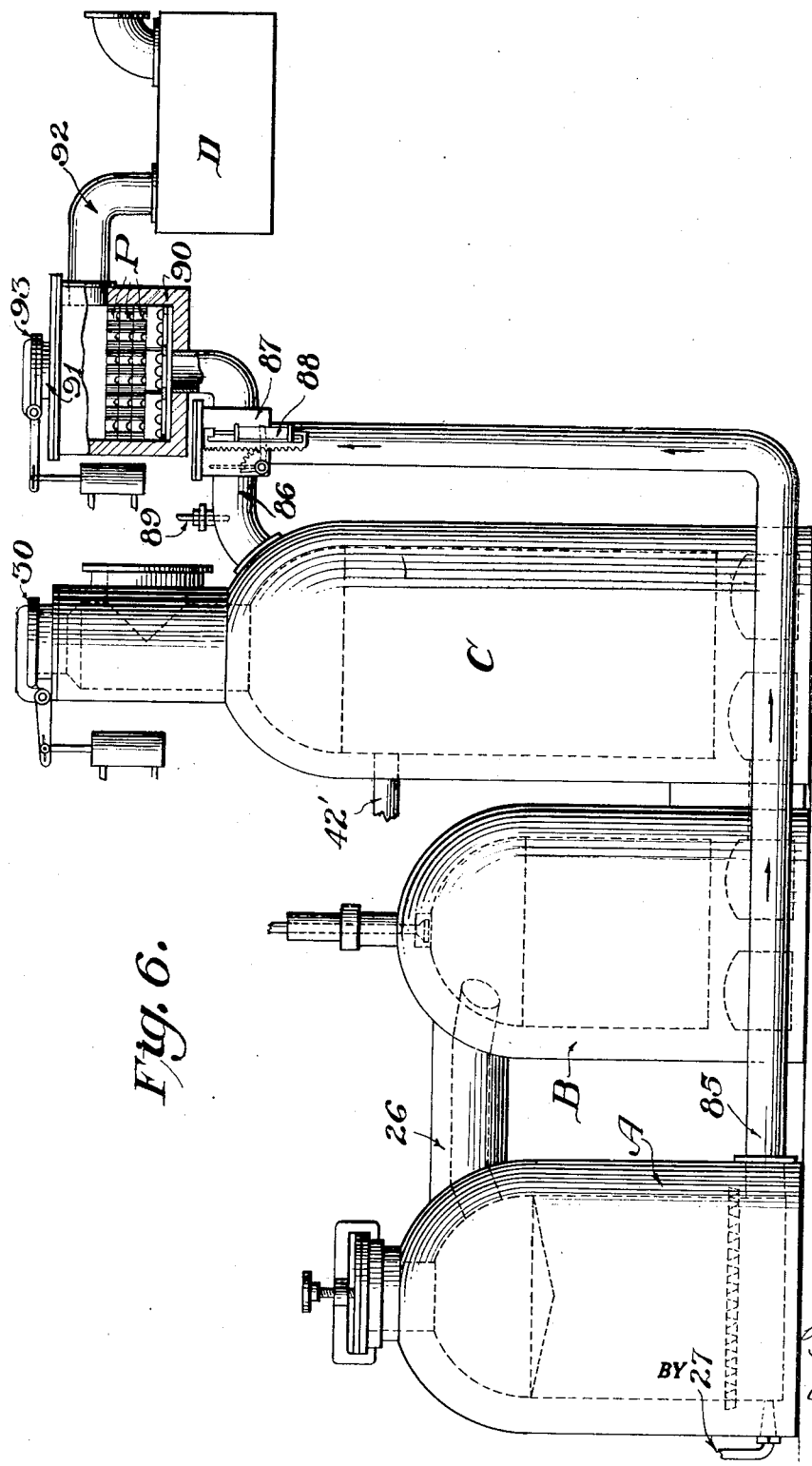

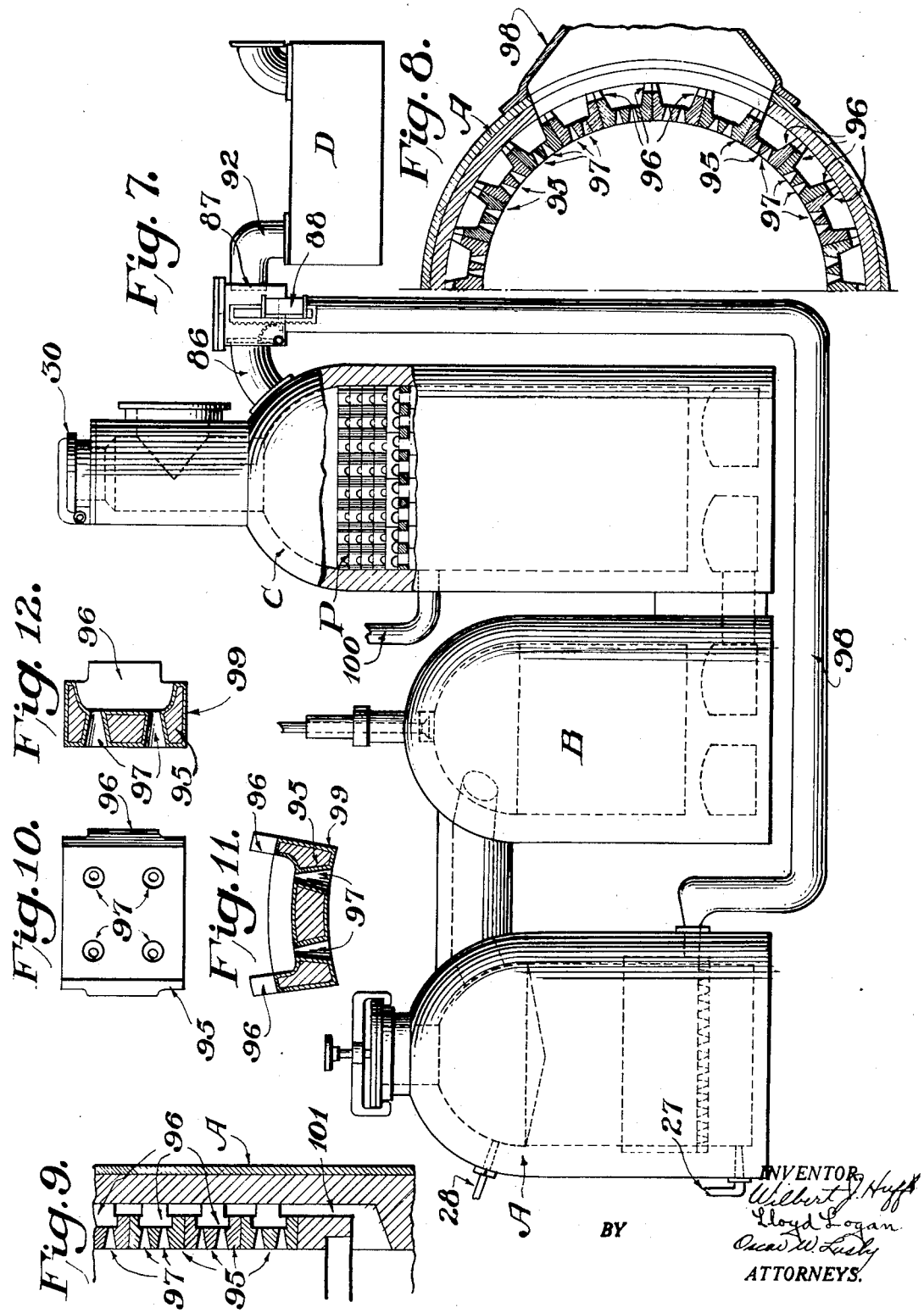

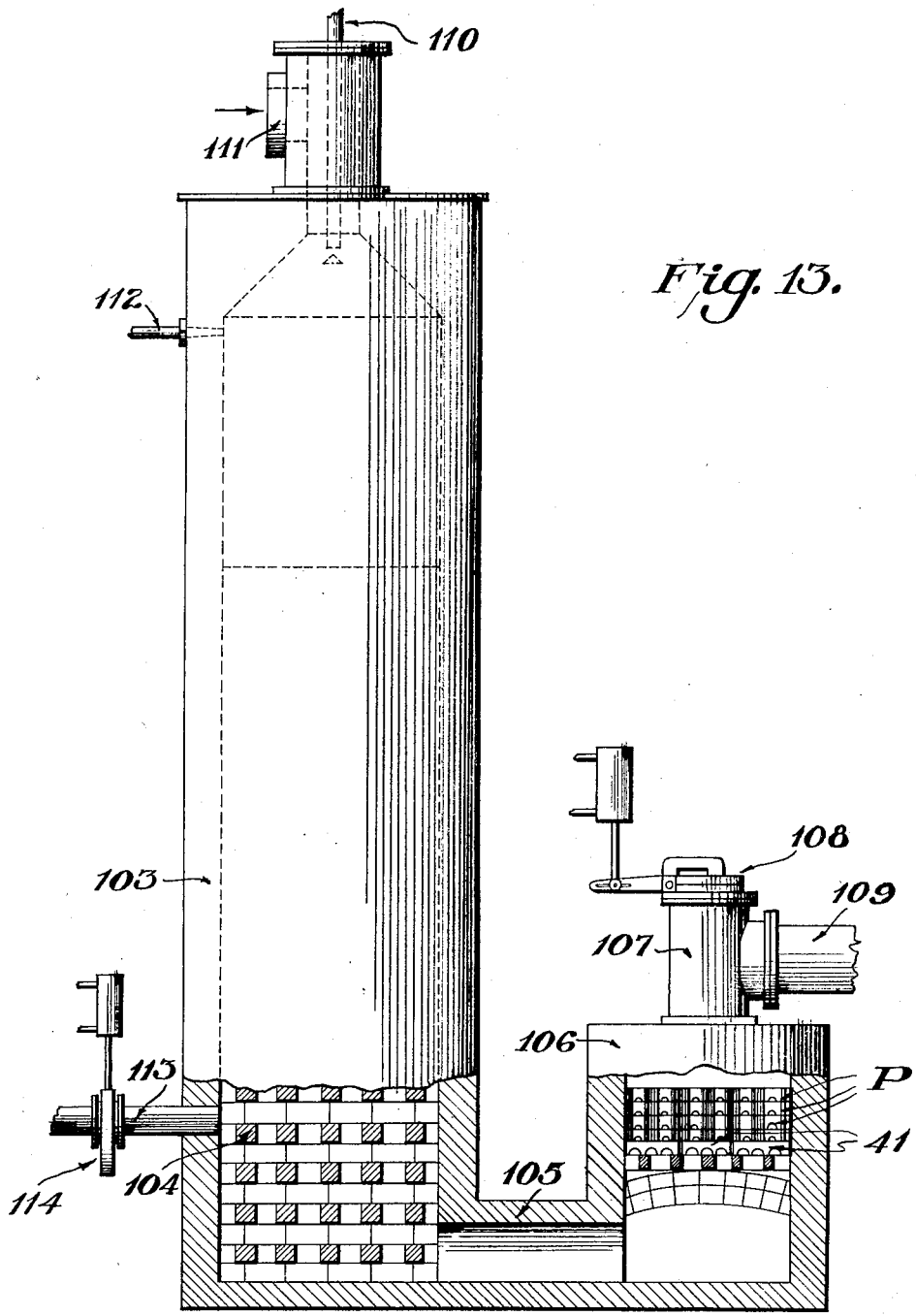

1,947,779

UNITED STATES PATENT OFFICE 1,947,779

APPARATUS FOR PURIFYING GAS

Wilbert J. Huff, Lloyd Logan, and Oscar W. Lusby, Baltimore, Md., assignors to Wilbert J. Huff, agent Original application April 25, 1930, Serial No. 447,228. Divided and this application July 17, 1931. Serial No. 551,430

8 Claims. (Cl. 23—260)

This invention relates to the purification of gas, and particularly to apparatus for purifying combustible gas in combination with apparatus for making gas, and is a division of our co-pending application 447,228, filed April 25, 1930. This relates particularly to the gas purifying apparatus.

The object of our invention, in general, is to provide apparatus for effecting rapid and complete elimination of sulfur compounds, both inorganic and organic, from combustible gas. Such purification is important in the preparation of gas for domestic and industrial purposes in effecting a reduction in the corrosion of apparatus for gas manufacture and utilization, and also in the preparation of gas for use in processes involving catalytic reactions.

In our co-pending applications, Ser. No. 250,331, filed Jan. 28, 1928, and Ser. No. 353,888, filed April 9, 1929, we have described and claimed a process for the elimination of hydrogen sulfide and organic sulfur from gas by bringing the gas into contact with purifying materials at temperatures above 250° C., the materials comprising, preferably, an intimate mixture of at least one metal, or oxide of a metal, belonging to the fifth, sixth, or seventh group of the periodic system of elements with at least one metal, or oxide of a metal, belonging to another group of the periodic system, said materials being amenable to revivification by an oxygen-containing gas, such as air. By the term "periodic system" we refer to the periodic arrangement of the chemical elements after Mendeljeff as revised and shown on pages 474 and 475 of the 13th edition of the Handbook of Chemistry and Physics published by the Chemical Rubber Company. The purifying materials which we have found to be especially effective are various combinations of copper and vanadium; copper and chromium; copper and uranium, and copper, chromium, and uranium. We have found that when sulfur bearing gases are brought in contact with these materials at elevated temperatures the materials react readily with the sulfur in hydrogen sulfide and organic sulfur, retaining the sulfur in combination. The process described in the applications referred to is a cyclic one, comprising alternately fixing the sulfur impurities in the gas and revivifying the purifying materials. We have found that the activity of the materials can be maintained over long periods of time and that by employing sufficiently short cycles, the amount of the purifying materials, or volume occupied thereby, can be made very small as compared with the units of the gas manufacturing plant.

The present invention relates to apparatus suitable for carrying out the above mentioned process, and especially to such apparatus in combination with a gas plant having a cyclic operation, including alternate making and heating periods, such as plants for the manufacture of blue gas, carburetted water gas, Pacific coast oil gas, etc. The principles of the invention, however, can be readily applied in apparatus adapted for use with other than a cyclic gas manufacturing process, as will hereinafter appear.

The accompanying drawings show, somewhat diagrammatically, apparatus embodying the invention applied to certain gas manufacturing processes which we have selected to illustrate the uses of the invention. In these drawings:

Fig. 1 is a sectional view of a typical plant for the manufacture of carburetted water gas, showing in combination therewith elements of our invention;

Fig. 2 is a diagrammatic view of an automatic controlling system used in connection with our purifying apparatus;

Figs. 3 and 4 are plan and side views, respectively, of a refractory form adapted to carry the purifying materials;

Fig. 5 is a sectional elevation of a modified apparatus for effecting purification at lower temperatures;

Figs. 6 and 7 illustrate the invention applied to a carburetted water gas plant operated with "back run";

Figs. 8 and 9 are, respectively, horizontal and vertical sectional views through the lower portion of the generator shown in Fig. 7, and Figs. 10, 11 and 12 show a form of block used for lining the lower portion of this generator;

Fig. 13 illustrates the invention applied to apparatus for manufacturing oil gas; and Fig. 14 is a diagrammatic view illustrating a further application of the invention.

Referring to Fig. 1, which shows our invention applied to a straight-run carburetted water gas plant, the generator of the plant is shown at A, the carburetter at B, the superheater at C, and the wash box at D. The construction and operation of the plant are familiar to those skilled in the art, and therefore need be referred to herein only briefly.

The generator A contains a fuel bed 20 which is maintained at a suitable depth by feeding fuel intermittently through an opening 21 at the top of the generator. The carburetter and superheater are partly filled with checker brick 22 and 23, which furnish cracking surfaces for the oil injected in the top of the carburetter by an oil spray 24 during the periods of the run and which store the heat necessary for cracking the oil vapors during the blast periods.

The carburetter and superheater communicate with each other at the bottom through a gas way 25, while the generator and carburetter are connected at the top by a pipe 26. Air and steam are adapted to be supplied to the bottom of the generator by a blast pipe (not shown) and a steam pipe 27, and steam can also be supplied above the fuel bed for down runs by a steam pipe 28. The superheater has a stack 29 adapted to be closed and opened by a valve 30, said stack being open during the blast periods for discharging the combustion products to the atmosphere (when a waste heat boiler is not used) and being closed during the periods of the run to direct the manufactured gas to the wash box D and thence to the condenser and relief holder.

The plant is operated with alternate run and blast periods, as is well understood. According to the "split-run" method of operation, steam is first introduced at the bottom of the generator, then at the top and finally again at the bottom, the steam inlets being controlled by valves operated in unison with the hot valves 31 and 32 in the pipes 26 and 33 which are respectively adapted to conduct the blue gas from the top and bottom of the generator to the carburetter. The steam passing through the incandescent bed of fuel reacts with the carbonaceous fuel to form blue gas which passes into the carburetter through the pipe 26 or the pipe 33, according as the run is up or down, and in the carburetter this blue gas commingles with the oil vapor and passes downwardtherewith through the checker work in the carburetter, thence through the gas way 25 and upwardly through the checker work in the superheater and finally out through the hot gas connection 34 to the wash box D, the oil vapors being cracked and thereby converted into fixed gases in their passage over the hot surfaces of the checker brick.

The endothermic reaction of the steam with the carbon to form blue gas soon causes the temperature of the fuel bed to be lowered below the proper temperature for the formation of blue gas, and when this point is reached, the steam and oil spray are shut off and the air blast connection to the bottom of the generator is turned on. Air now passes through the fuel bed causing combustion and consequent rise in its temperature. The combustion gases, comprising carbon dioxide and carbon monoxide, pass into the carburetter through the pipe 26 and the carbon monoxide is burned by secondary air introduced from a blast pipe 35 through a pipe connection 36 controlled by a valve 37. The heat of combustion of this producer gas and sensible heat of the combustion products are stored in the checker brick of the carburetter and superheater as the gases pass thereover on their way to the atmosphere or to the waste heat boiler, as the case may be. When temperatures of the fuel bed and the checker brick have been thus raised to the proper values, the air blasts are cut off and the steam and oil are again turned on to begin the cycle anew. In changing from run to blast, a short interval preferably elapses between the turning on of the generator blast and the opening of the stack valve in order that the producer gas may purge the apparatus of carburetted water gas and pass this gas through the wash box rather than waste it through the stack. The secondary air valve 37 is then opened.

The above sets forth briefly the usual straight-run operation of a carburetted water gas machine. There are several modifications of the water gas process, such as, the back run process in which the down run steam is admitted adjacent the top of the superheater and the blue gas formed in the generator is by-passed to the wash box; the reversed air blast process in which the ordinary blow is followed by a reversed air blast, with the air entering the top of the superheater and blowing down through the superheater, up through the carburetter and down through the fuel bed in the generator, and the producer gas formed in the generator being by-passed to the wash box; the Chrisman down run process which is similar to the back run process in that the down run gas by-passes the carburetter and superheater, but which differs therefrom in that the down run steam is introduced at the top of the generator instead of at the top of the superheater. Apparatus embodying the present invention is readily applicable to all of these specific processes, as well as to processes of manufacturing oil gas, producer gas, coal gas, etc.

In a modern water gas plant the various valves controlling the generator and carburetter air blasts, the steam and the oil spray, and the hot valves, the stack valve, etc. are all operated automatically, usually by the pistons of hydraulic motors associated respectively with the valves and controlled by pilot valves located at a control station, such as indicated diagrammatically at E, Fig. 1. These pilot valves are operated in correct time relation by means of cams driven by a constant speed electric motor, the angular positions of the cams being manually adjustable so that the operating cycle of the process can be altered at will to suit the varying operating conditions. It is deemed undesirable to complicate the drawings and description with a complete disclosure, or layout, of the plant, since the invention can be very clearly understood by those versed in the art without such a disclosure. No attempt, therefore, has been made to show all of the pipe connections and valves and their operating and controlling mechanisms, and such valves and operating mechanisms as have been illustrated are shown in a rather diagrammatic manner.

The present invention provides apparatus for the use of purifying materials, such as those described in our co-pending applications, referred to above, in a gas manufacturing plant such as shown in Fig. 1, by locating said materials in the path of the hot gas, so that the sulfur impurities therein will be fixed by said materials during the make periods of the process and by providing means to render the blast gas effective to revivify the materials. The purifying materials may be located at any proper and convenient point. In the illustration they are shown located at P on top of the checker brick in the superheater.

To insure complete elimination of the sulfur compounds from the manufactured gas, the purifying materials should present a large contact surface. A form which has been found efficient in actual use is shown on a somewhat larger scale in Figs. 3 and 4. This form which is claimed per se in a co-pending application, Ser. No. 446,930, filed April 24, 1930, consists of a cylindrical body divided interiorly into five equal passages by walls 38 which converge at the axis of the body and having exterior wedge shaped fins 39 projecting in the planes of the walls 38, the body being cut away at its lower end between the fins to provide lateral gas passages 40. The form is composed of suitable refractory material, such as clay, and the purifying material may be incorporated therein. If desirable the purifying metals such as the oxides of copper and vanadium, in finely divided and intimately mixed condition, may be incorporated with plastic clay and the body coated with the mixture, after which the form is baked for a sufficiently long time and at a sufficiently high temperature to produce a hard resistant mass. The purifying units thus constructed are loosely stacked on grid-like supporting members 41 which cover the top course of the checker brick to provide a secure base for the stacked units.

During the run periods of the carburetted water gas plant illustrated by Fig. 1, the hot carburetted gas sweeps upwardly through the several layers of the purifying units to be brought into contact with the purifying material which is coated on all surfaces of said units. The sulfur compounds contained in the gas, both hydrogen sulfide and organic sulfur compounds, are simultaneously removed from the gas by the reaction of said compounds with the purifying materials, the sulfur being retained in combination with the metals, or oxides. The sulfur impurities are thus substantially entirely eliminated from the gas, as well as any oxygen which may be present.

The purifying materials, which have become fouled by the sulfur and by deposit thereon of tarry substances, are revivified during the periods of the blast. This is accomplished by rendering the blast gases effective to oxidize the sulfides formed with the purifying metals and to burn off the tarry deposits. The blast gases might be made effective to revivify the purifying materials by regulating the secondary air introduced through valve 37 so as to introduce an excess of air over that required to burn the producer gas. However, we prefer ordinarily to introduce the revivifying air into the blast gases through an entirely separate and independent connection, as by so doing the revivifying air is more easily controlled and it is not necessary to disturb the usual operations performed in the gas manufacturing process.

The tertiary, or revivifying, air may be introduced at any convenient point into the blast gases before they sweep through the purifying materials. As shown in Fig. 1, tertiary air is introduced through a pipe 42 supplied with air from the blast pipe 35. The pipe connection 42 is controlled by a valve 43 which is adapted to be operated by a motor 44 controlled from the table E and timed to open a few seconds after the secondary air valve 37 has opened. An explosion might occur if tertiary air were introduced before the combustible gas was purged from the superheater. By timing the operation of valve 43 so that it will open a few seconds after the opening of the secondary air valve 37, assurance is had that the combustible gas will have been swept out of the apparatus by the inert blast gases before the tertiary revivifying air is admitted. The timing of the operation of valve 43 is also such that this valve will close shortly before the termination of the blast period, to insure the purging of the superheater of oxygen before commencing the generation of combustible gas.

For various reasons, it is desirable that only so much tertiary revivifying air be admitted as is required for revivification of the purifying materials; a substantial excess of air should be avoided. Accordingly in addition to the primary control of the revivifying air by valve 43, we provide a secondary automatic control adapted to govern the quantity of this air in accordance with existing conditions. This secondary control is effected by a damper 45 located in pipe 42 between valve 43 and the superheater. Obviously after the valve 43 has opened, the quantity of tertiary air admitted to the superheater will be governed by damper 45.

Damper 45 is automatically governed by the oxygen content of the blast gases after their passage through the purifying materials. Fig. 2 shows schematically an automatic apparatus suitable for this purpose. Referring thereto, numeral 46 designates a sampler tube inserted through the wall of the superheater near the top thereof and connecting on the outside with a valve casing 47 in which a disk valve 48 operates. This valve is adapted to seat on the end of a pipe 49 projecting up through the bottom of the valve casing. Preferably valve 48 is operated in synchronism with the secondary or tertiary air valve, and for this purpose it is connected to the piston of an hydraulic motor 50 which is controlled by connections leading to a pilot valve at the control table timed to operate in synchronism with the pilot valve controlling the secondary or tertiary air valve.

Communicating with pipe 49 is a pipe 51 through which a uniform flow of hydrogen is adapted to be passed to pipe 49 from a small electrolytic hydrogen generator, indicated diagrammatically at 52. The source of current for operating generator 52 is shown as a storage battery 53. The connections of battery 53 to the generator should be automatically controlled so that the generator will be energized only when required, that is, only during the blast or revivification periods. For this purpose the connections from battery 53 may be conveniently controlled by a switch 54 operated by some part moving with sampler valve 48, the switch being closed to connect the battery with the generator when the sampler valve is opened to admit gas to pipe 49 and being opened when the sampler valve is closed. An adjustable resistance $r$ and an ammeter $a$ may be inserted in the connections to facilitate the maintenance of a substantially constant current through the hydrogen generator. As an alternative arrangement, a storage supply of hydrogen can be connected with pipe 51 and an automatic valve placed in said pipe and connected for operation synchronously with valve 48. A flow regulator 55 of any suitable type is inserted in pipe 51 to effect a uniform flow of hydrogen into pipe 49, and a similar regulator 55' is inserted in pipe 49 to effect a predetermined uniform flow of the gas sample.

Pipe 49 is branched beyond the point where it communicates with pipe 51, one branch including a cock 56, a combustion pipette 57, a tube 58 containing a suitable drying agent, and one member 59 of a thermal conductivity cell of a known type, such as the Engelhard cell; and the other branch including a cock 60, a drying tube 61 and another member 62 of said cell. The members 59 and 62 of the cell inclose fine quartz incased platinum coils 63 and 64, respectively, included in two of the arms of a Wheatstone bridge, as clearly shown in Fig. 2, the two remaining arms of the bridge including adjustable resistances R and R'. A battery B maintains a suitable difference of potential between the terminals of the bridge and a translating device, such as a galvanometer 65, is connected in the bridge wire and controls the circuits of two relays 66 and 67 which in turn control the operation of an electric motor 68 connected through suitable reduction gearing with the damper 45.

The operation of the above described automatic controlling system for the tertiary revivifying air is briefly as follows: During the periods of the run, sampler valve 48 closes communication between sampler tube 46 and the pipe 49 which communicates with the thermal conductivity cell, and the storage battery 53, which furnishes energy for the operation of the hydrogen generator 52, the relays 66, 67, and the damper operating motor 68, is cut out at switch 54. The electrical resistances constituting the arms of the Wheatstone bridge are so adjusted that under these conditions no current flows through galvanometer 65 and consequently its pointer makes contact with a stationary contact 69 connected to relay 67. However, due to the fact that storage battery 53 is cut out, relay 67 is not energized. In changing from run to blast, sampler valve 48 opens synchronously with the opening of the secondary or tertiary air valve, as heretofore pointed out, admitting a small proportion of the gases at the top of the superheater to pipe 49 and connecting up the storage battery 53 to the hydrogen generator 52 and to the supply lines 71 and 72 for the relays 66, 67 and motor 68. The generator 52 immediately produces hydrogen which flows at a uniform rate to pipe 49 through the flow regulator 55. The mixed hydrogen and blast gases then divide, one part passing through combustion pipette 57 and drying tube 58 to the member 59 of the thermal conductivity cell, while the other part passes through the drying tube 61 and through the other member 62 of said cell. If no oxygen is present in the blast gases above the purifying materials, the constitution of the gaseous mixture will remain unaltered in the passage of the gases through these two branches, so that the heated cell coils 63 and 64 included in the arms of the Wheatstone bridge, being subjected to exactly the same conditions, will have their electrical resistance varied, if at all, in exactly the same degree, with the result that the bridge will not be unbalanced and therefore no current will flow through galvanometer 65. Hence the pointer of the galvanometer will remain in engagement with the stationary contact 69, causing relay 67 to be energized to close its contacts, which will result in the operation of motor 68 in such a direction as to move damper 45 towards its open position, increasing the amount of tertiary air until oxygen occurs in the blast gases above the purifying materials and in the sample of these gases mixed with hydrogen passing through the two branches of the oxygen detecting apparatus. The oxygen contained in the gas which passes through the branch including combustion pipette 57 will combine with the hydrogen contained in this gas, or a portion of the hydrogen, so that the gaseous mixture passing through member 59 of the thermal conductivity cell will contain a smaller proportion of hydrogen than is contained in the gas passing through the member 62 of said cell. Due to the high thermal conductivity of hydrogen, the heated coil 64 will have its temperature lowered with respect to the heated coil 63, the electrical resistance of coil 64 decreasing in the same ratio with respect to the resistance of coil 63, which will result in unbalancing the bridge and sending a current through galvanometer 65 in such direction as to cause its pointer to move from contact 69 towards a contact 69'. This will open the circuit of relay 67, which in turn will open the circuit of motor 68, bringing the damper to rest in a position where it permits only a very small percentage of excess revivifying air to pass into the superheater. If this small percentage should be exceeded, a sufficiently strong current would flow through the galvanometer (the current being proportional to the per cent of excess air) to cause the pointer to move into engagement with contact 69', closing the circuit of relay 66 and thereby causing the motor to operate in a reverse direction, that is in a direction to move damper 45 towards its closed position, decreasing the per cent of excess air and causing the pointer of the galvanometer to move back out of engagement with contact 69', stopping the motor. Thus the amount of revivifying air is maintained substantially constant and in slight excess of the amount actually required for revivification. This automatic control therefore insures that under all conditions the amount of revivifying air will be sufficient but will not be in excess to any substantial degree.

Our experiments have indicated that a more complete removal of the sulfur impurities from the gas can be effected at lower temperatures than occur in the superheater of a carburetted water gas machine. Therefore while we have found in the actual commercial use of apparatus embodying the invention that purification of the gas at the high temperatures in the superheater is satisfactory for practical purposes, in some cases it may be desirable to carry out the purification at lower temperatures, for example, at temperatures around 1000° F. We have accordingly devised an apparatus suitable for this purpose, which can be readily installed in existing gas plants. Fig. 5 shows this apparatus somewhat diagrammatically, as applied to a straight run carburetted water gas plant. The apparatus comprises a heat interchanger and cooler H, and a receptacle I for the purifying materials, located between the superheater C and the wash box D.

The heat interchanger and cooler H comprises an enclosed chamber or shell divided centrally by a partition 72, which extends from the bottom of the chamber to a point near the top, to compel the gases, entering at the bottom through gas off-take pipe 73 to pass upwardly on the entering side of the partition and downwardly on the exit side. The chamber is partly filled with checker brick on both sides of the partition wall. A spray pipe 74 is inserted through the top of the chamber directly above the checker brick on the downcomer side, this water spray being controlled by an automatically operated valve 74'. An air blast pipe 75 is inserted through the bottom of the heat interchanger and cooler on the upcomer side and is equipped with an automatic valve 76. Gas offtake pipe 73 is also provided with an automatic valve 77.

The receptacle I for the purifying materials is preferably a cylindrical shell communicating at the bottom with the downcomer side of the heat interchanger and cooler through a gas way 78, the shell being provided with a suitable door through which the purifying materials may be conveniently replaced. The purifying forms are suitably supported on an arch 79 at the lower end of the receptacle. The shell near its top communicates with the wash box D through a pipe 80 and with a stack 81 equipped with an automatic valve 82.

The function of the heat interchanger and cooler is to lower the temperature of the gas to the desired degree before passing it in contact with the purifying materials and to raise the temperature of the revivifying air to a degree suitable for revivification. The operation may be briefly described as follows: During the blast periods valves 77 and 74' are closed while valve 76 and the stack valve 82 are open. Thus the blast gases pass out of the superheater stack, or to the waste heat boiler as the case may be, without being brought in contact with the revivifying materials, while revivifying air passes up through the hot checker brick on the upcomer side of H and down through the somewhat cooler checker brick on the downcomer side, abstracting sufficient heat therefrom to raise its temperature to the proper degree for revivification, and thence passes through the purifying material and out through the stack 81.

In order to purge the heat interchanger and cooler and the purifying receptacle of air prior to admission of combustible gas, air valve 76 is closed and valve 77 is opened shortly before the end of the blast period, so that the inert blast gases will sweep the air out through stack 81. The superheater stack valve 30 may be closed during this purging period, if the back pressure at the stack is insufficient to force the blast gases through the heat interchanger and cooler and the purifier. As an alternative, the purging may be effected by steam.

During the periods of the run, air valve 76 and stack valve 82 are closed, and valves 74' and 77 are open, thus passing the combustible gas to the wash box D and introducing a cooling water spray above the checker brick on the downcomer side of the heat interchanger and cooler. This cooling spray will lower the temperature of the gas prior to its passage over the purifying materials, keeping the temperature of the latter down to a desired degree, for example, 1000° F. This method of water cooling dilutes the gas to some extent with steam, but the diluting effect is of no practical consequence, as it merely increases the total water vapor accompanying the gas.

To purge the apparatus of combustible gas prior to admission of revivifying air the closing of valve 77 is delayed until slightly after the commencement of the blast, so that the blast gases will have time to sweep the combustible gas out of the apparatus before valve 76 is opened to admit the air.

In connection with the apparatus shown in Fig. 5 we may use purifying apparatus similar to that shown in Fig. 1, whereby purification of the gas is effected in two stages, a portion of the sulfur being removed by the purifying materials P in the superheater and the remaining portion by the materials P' in the receptacle I. Thus we provide a series gas purification process by which the gas is purified in a plurality of steps at progressively lower temperatures.

Apparatus embodying our invention is readily applicable to the various specific methods of operating water gas and carburetted water gas machines. We will not attempt to show our apparatus in connection with all of the known methods of operation, for to do so would render the description and drawings prolix. We have in the above description shown how the invention may be applied to a straight run carburetted water gas machine, and in the following description we will show the application of the invention to machines operating on the back run or the Chrisman down run principle.

Fig. 6 shows diagrammatically the principal element of a plant operated with back run. In this machine the generator A, carburetter B, superheater C and wash box D may be constructed as in the straight run machine previously described. The pipe connection leading from the bottom of the generator to the carburetter and the hot valves in this connection and in the pipe 26 are omitted in the back run machine. In the latter a back run pipe 85 connects the bottom of the generator to the gas off-take pipe 86 leading from the top of the superheater, and a three way valve 87 is provided to control communication of the pipes 85 and 86 with the wash box, this valve being automatically operated through a rack and segment gear by the piston of an hydraulic motor 88 and being adapted to place the pipes 85 and 86 alternately in communication with the wash box D. The up runs of this machine are carried out in the same manner as in the straight run machine, steam being admitted at the bottom of the generator through pipe 27 and the blue gas formed passing with the oil gas through the carburetter and superheater to the wash box. In the back runs, however, steam is admitted through a connection 89 to the gas off-take pipe 86 between the superheater and valve 87 and passes through the superheater and carburetter and then passes down, in a highly superheated condition, through the fuel bed in the generator, the blue gas formed passing through back run pipe 85 to the wash box, by-passing the carburetter and superheater.

In applying our invention to this back run machine, we may insert between the three-way valve 87 and the wash box, a receptacle 90 in which the purifying forms P are stacked, so that the gas generated both in the up runs and in the down runs pass through this purifying material. Receptacle 90 is provided with a stack 91 having an automatic valve 93. The air for revivifying the purifying materials may be supplied through a pipe 42' opening into the superheater, whereby the revivifying air is heated to the proper degree for revivification. This revivifying air may be controlled in substantially the same way as described in connection with the apparatus shown in Fig. 1. Revivification of the purifying materials may be effected by the blast gases, mixed with air, and for effecting this result, the superheater stack valve may be closed during the blast periods so as to pass the gases through the receptacle 90 and out through stack 91.

Figs. 7 to 12 illustrate a further application of the invention to a carburetted water gas machine operating with the back run. The generator of this machine employs a lining composed of blocks 95, the lining, as indicated in Fig. 7, extending from the grate upwardly to a plane about half way between the grate and top of the fuel bed. The blocks may be constructed as shown in Figs. 10, 11, and 12, each consisting of a rectangular body hollowed out at the back and formed at the sides with spacing projections 96 and having perforations 97 which are flared towards the fuel bed. The lining formed by these blocks is spaced from the inner wall of the generator by the projections 96, as clearly shown in Figs. 8 and 9 so that gases may pass from the fuel bed through the perforations 97 to the space back of the lining, or from said space to the fuel bed.

The back run pipe 98 connects with the space between the lining and the inner wall of the generator at a point just above the grate, through a connection which is flared horizontally and contracted vertically, as indicated in Figs. 7 and 8, so that the gas will pass through substantially the entire depth of the fuel bed before entering the back run pipe. The back run pipe 98 is connected to the valve chamber 87 to which is also connected the gas off-take pipe 86 leading from the superheater, the valve in this casing being operated by the piston of a motor 88 to place the pipes 86 and 98 alternately in communication with the wash box D, as in the construction shown by Fig. 6. The machine may be operated either on the Chrisman down run principle or on the back run principle. In the former case steam connections 27 and 28 below and above the fuel bed will be provided as in the straight run machine, while in the latter case, steam connection 28 will be omitted and a steam connection provided, such as shown at 89 in Fig. 6.

In applying our invention to the machine shown in Figs. 7 to 12, we may coat the blocks 95 with our purifying materials, as indicated at 99, for the purpose of purifying the down run, or back run, blue gas, or we may insert purifying materials in the spaces between these blocks and the generator shell. For the purpose of purifying the carburetted water gas formed in the up runs, we locate in the upper part of the superheater purifying forms P. The blocks may be coated with our purifying materials in the same way that the forms P are coated, that is by mixing the purifying materials in finely divided condition with plastic clay and coating the blocks with this mixture. Air for revivifying the purifying materials P in the superheater may be admitted and controlled through a pipe 100, as in the straight run machine shown in Fig. 1.

In the down, or back, runs the blue gas formed by the passage of steam through the fuel bed passes through the perforations 97 into the spaces between the block lining and the generator wall and thence out through the pipe 98 and through the valve casing 87 and pipe 92 to the wash box, the sulphur impurities of the gas being fixed by the purifying materials on the block lining. In the up runs, the gas is purified by passage over the forms P in the superheater, as in the straight run machine. In the blast periods the purifying materials, both on the blocks 95 and on the forms P, are revivified. A portion of the air blast passes through passage 101 leading to the space back of the lining and circulates around and through the lining blocks before entering the fuel bed, and thereby effects revivification of the purifying materials coated on these blocks. For effecting revivification of the purifying materials P in the superheater, tertiary air may be added to the blast gases through pipe 100 in the same manner as described in connection with the straight run machine.

Fig. 13 illustrates an application of our invention to a method of making oil gas, which is practiced extensively on the Pacific coast. The apparatus illustrated comprises a shell 103 partly filled with checker brick 104 and connected at the base by a passage 105 with a purifying receptacle 106 in which is supported in any suitable way stacks of forms P coated with our purifying materials. Receptacle 106 is provided with a stack 107 having a valve 108 and having a lateral gas off-take 109 leading to a wash box (not shown). Shell 103 has an opening at its top through which an oil and steam pipe 110 extends and through which an air blast may be introduced by a pipe (not shown) connected at 111. The shell is also provided with steam connections 112 through which steam is injected in the making periods.

The process of operating the oil gas apparatus shown is a cyclic one, including alternate making and heating periods. In the making periods, atomized oil is introduced through the pipe 110 and steam through pipe 112. The steam and oil vapors pass through the hot checker brick to form the oil gas, which passes out of the base through the connection 105 and thence upward through the purifying materials P and out through the gas off-take 109 to the wash box, the purifying materials reacting with the sulphur compounds in the gas to fix the sulfur. The heating period is usually divided in two parts. During one of these, air alone is blown into the shell through the connection at 111. This serves to burn off some of the carbon deposited on the checker brick from the gasification of the oil, and in so doing stores up some heat in the checker brick. After blowing with air alone for a few minutes, oil in atomized condition is injected through pipe 110 and burns with the air, the hot products passing through the checker brick and heating them to the gas making temperature, which is usually 1600° to 1800° F., and thence passing through the purifying material P and out to the atmosphere through stack 107. The gases in the heating period may be rendered effective to revivify the purifying materials either by introducing an excess of air over that required to burn the carbon on the checker brick and to burn the oil, or by providing a secondary air connection at some convenient point in advance of the purifying materials, as at 113, said connection being governed by a valve 114, timed to open and close the secondary air connection at the desired times in the heating period.

Fig. 14 illustrates an application of our invention to a continuous gas purification process adapted to be carried out in a separate plant independently of any particular gas making plant. This method of purification may sometimes be desirable where it is impracticable to make changes in existing gas manufacturing units, or where it is desired to purify natural gas.

The purifying apparatus diagrammatically shown by Fig. 14 comprises a heater 115, two or more purifiers 116, 116', a recuperator 117, and pipes and valves connecting these units. Revivification of the purifying materials in this apparatus is preferably effected by heated flue gas mixed with air. The flue gas, which ordinarily does not have a sufficiently high temperature to effect revivification when mixed with cold air, is passed through the heater 115 where the gas is heated for example to between 350° to 500° C. and thence passes by pipe 118 or 119 through the purifier 116 or 116', a sufficient proportion of air being added to the heated flue gas prior to passage through the purifier by pipe connections 120 and 121 which communicate with a suitable source of air under pressure. The flow of flue gas through pipes 118 and 119 is controlled by valves 122 and 123, respectively, these valves being connected for simultaneous operation by a hydraulic motor 124'. Similarly, the flow of air through pipe connections 120 and 121 is controlled by valves 124 and 125, respectively, connected for simultaneous operation by a hydraulic motor 126.

In the positions shown by the drawings, valve 122 is closed while valve 123 is open and valve 124 is closed while valve 125 is open. Heated flue gas therefore is flowing through pipe 119 while cold air is entering pipe 119 through pipe 121, the mixture of flue gas and air passing through purifier 116' and effecting revivification of the purifying materials therein, and thence passing with the gaseous products of revivification through valve 126 and pipes 127 and 128 to the recuperator 117 and out to the atmosphere through pipe 129. Gas enters the recuperator through pipe 130 and in its passage therethrough is heated up to the required purification temperature, in excess of 250° C., by the hot gases entering through pipe 128. The heated gas then passes through pipe 131 and either through valve 132 to purifier 116 or through valve 133 to purifier 116'. Valves 132 and 133 are connected for simultaneous operation by a hydraulic motor 134. In the positions of these valves shown by the drawings, valve 132 is open while valve 133 is closed, so that the heated gas is passing through purifier 116, where its sulphur impurities are fixed by the purifying materials therein, the purified gas then passing through valve 134 to a pipe 135 which connects with a suitable gas holder (not shown). Valves 126 and 134 are connected for simultaneous operation by a motor 136. These valves are three-way valves, each being adapted in one position to connect its associated purifier with pipe 135 and in its other position to connect the purifier with pipe 128.

When the valves are reversed from the positions shown, heated flue gas and air will pass through the purifier 116 to effect revivification of the purifying materials and gas will pass through purifier 116'. Thus the purification process is carried out continuously, the gas being passed through one purifier while the materials in the other are being revivified.

If desired, the valve operating motors 124, 126, 134 and 136 may be controlled automatically by suitable known timing mechanism, so as to effect the purification of the gas and revivification of the purifying materials in accordance with any desired predetermined cycle. In order to prevent explosions, when changing a purifier from purification to revivification, air valves 124 and 125 are timed so as to open a few seconds after the opening of valves 122 and 123, respectively, thus giving the inert flue gas time to sweep the combustible gas out of the purifier before admitting air.

With apparatus similar to that shown in Fig. 14, gas can be purified under pressure, which is sometimes desirable, as for instance, when purifying natural gas. With short cycles of operation the purifiers may be made very small.

While we have described and shown our invention with considerable detail and particularly in its application to a number of specific gas manufacturing processes, it is to be understood that the invention in its broader aspects is not limited by the specific constructions described and shown and is capable of many applications other than those suggested.

We claim:

1. Gas purifying apparatus comprising a receptacle, purifying materials in said receptacle consisting of refractory materials intimately associated with a chemical containing an element found in the classification first group fifth and seventh series of the periodic table in intimate association with a chemical containing at least one element found in the classification comprising the fourth and twelfth series of the fifth, sixth, and seventh groups of the periodic table, and means for alternately passing combustible gas and an oxygen-containing gas over said materials, and means for automatically regulating the amount of oxygen in said oxygen-containing gas after passing through said purifying materials.

2. Gas purifying apparatus as described in claim 1, said receptacle containing in addition refractory heat transfer surfaces arranged in flues and checkers.

3. Gas purifying apparatus comprising a receptacle, refractory heat transfer surfaces after which are placed purifying materials in said receptacle consisting of refractory materials incorporated with copper and at least one chemical containing an element found in the classification comprising the fourth and twelfth series of the fifth, sixth, and seventh groups of the periodic table, a conduit supplied with air under pressure opening into the receptacle at a point in advance of the refractory heat transfer material, a valve controlling the passage of air through said conduit and automatic means for opening and closing said valve in synchronism with a purifying and revivifying cycle.

4. Gas purifying apparatus comprising a receptacle, refractory heat transfer surfaces in said receptacle, purifying materials in said receptacle, and automatic means for alternately passing combustible gas and an oxygen-containing gas over said purifying materials, in which the quantity of the oxygen containing gas admitted is controlled by automatic means responsive to the oxygen concentration in said gas after passing through said purifying materials.

5. Gas purifying apparatus as described in claim 3 in which the magnitude of the opening for admitting air is controlled by automatic means responsive to the oxygen concentration in the revivifying gases after passing the purifying materials.

6. Gas purifying apparatus comprising a combustion chamber contained within a shell, said chamber being substantially circular in cross-section, a cylindrical lining of refractory material spaced from said shell to define an annular space between the lining and shell, refractory purifying materials disposed in said annular space and designed to contact with the gas to be purified, a plurality of apertures communicating between said annular space and the interior of said combustion chamber, a conduit communicating with said annular space and adapted alternately to conduct air to and gas from contact with said purifying material, and automatic means for alternately passing air and withdrawing gas from said annular space.

7. An apparatus for intermittently purifying combustible gas in a cyclic operation consisting of a plurality of receptacles connected in series to form at least three elements and containing in the first, refractory heat transfer surfaces, in the intermediate, direct contact spray coolers and transfer surfaces and in the last purifying materials adapted to fix sulfur impurities and capable of being revivified by an oxygen-containing gas in conjunction with automatic means for admitting the combustible gas and operating the spray in one phase of the cycle and for cutting off the spray and admitting the oxygen-containing gas in another phase of the cycle.

8. An apparatus for the continuous removal of sulfur compounds from a combustible gas stream comprising a source of combustible gas, a means for admitting oxygen-containing gas, a heater, at least two purifiers which fix sulfur from the combustible gas stream and are revivified by the oxygen-containing gas stream, a recuperator, and pipes and valves connecting said units in conjunction with automatic means coacting to pass the gas stream through the heater and at least one purifier and the recuperator, while passing the oxygen-containing stream through the recuperator and at least one other purifier, and means for interchanging periodically the passage of the gases through the purifiers.

WILBERT J. HUFF.
LLOYD LOGAN.
OSCAR W. LUSBY.